US007768744B2

(12) United States Patent
Hsiao et al.

(10) Patent No.: US 7,768,744 B2
(45) Date of Patent: Aug. 3, 2010

(54) PERPENDICULAR MAGNETIC RECORDING WRITE HEAD WITH COPLANAR MAIN POLE AND RETURN POLES AND MAGNETIC RECORDING SYSTEM

(75) Inventors: Wen-Chien David Hsiao, San Jose, CA (US); Yimin Hsu, Sunnyvale, CA (US); Edward Hin Pong Lee, San Jose, CA (US); Vladimir Nikitin, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 638 days.

(21) Appl. No.: 11/743,150

(22) Filed: May 2, 2007

(65) Prior Publication Data
US 2008/0273268 A1 Nov. 6, 2008

(51) Int. Cl.
*G11B 5/147* (2006.01)
*G11B 5/17* (2006.01)

(52) U.S. Cl. .......................... 360/125.18; 360/125.27; 360/123.04; 360/123.05

(58) Field of Classification Search ............ 360/125.01, 360/125.02, 125.03, 125.06, 125.07, 125.16, 360/125.18, 125.2, 125.27, 125.29, 123.01, 360/123.02, 123.12, 123.04, 123.05
See application file for complete search history.

(56) References Cited
U.S. PATENT DOCUMENTS

| | | | | |
|---|---|---|---|---|
| 6,728,065 B2 * | 4/2004 | Batra et al. | ............ | 360/125.03 |
| 6,934,128 B2 * | 8/2005 | Tsuchiya et al. | ............ | 360/317 |
| 7,289,295 B2 * | 10/2007 | Guan et al. | ............ | 360/125.17 |
| 2005/0068669 A1 * | 3/2005 | Hsu et al. | ............ | 360/125 |
| 2005/0128637 A1 | 6/2005 | Johnston et al. | | |
| 2005/0280938 A1 * | 12/2005 | Sasaki et al. | ............ | 360/126 |
| 2008/0148552 A1 * | 6/2008 | Pentek et al. | ............ | 29/603.01 |
| 2008/0273277 A1 * | 11/2008 | Guan et al. | ............ | 360/319 |

FOREIGN PATENT DOCUMENTS

| | | |
|---|---|---|
| JP | 58080118 | 5/1983 |
| JP | 62-85913 U | 6/1987 |
| JP | 5094603 | 4/1993 |
| JP | 2004362688 | 12/2004 |
| NL | 8105878 | 7/1983 |

* cited by examiner

*Primary Examiner*—Julie Anne Watko
(74) *Attorney, Agent, or Firm*—Thomas R. Berthold

(57) ABSTRACT

A perpendicular magnetic recording write head has a main pole and return poles that are substantially coplanar. The write head includes a main pole, two return poles and a connecting stud that are all formed as a single layer in a single deposition and patterning step. The coplanar main and return poles lie in a plane parallel to the cross-track direction. The two return poles are thus spaced from the main pole in the cross-track direction. The main pole includes a write pole connected to it but lying in a plane spaced in the along-the-track direction from the plane of the main pole. The write head includes a helical coil wrapped around the main pole. The magnetic flux path is from the write pole to the disk recording layer in a data track aligned with the write pole, to the disk underlayer beneath the recording layer, through the underlayer to data tracks spaced cross-track from the data track aligned with the write pole, and back through the return poles.

19 Claims, 7 Drawing Sheets ively low-coercivity magnetically permeable underlayer (SUL) 14 formed on the disk substrate 12. This type of medium is shown with a magnetoresistive (MR) read head 80 and a single write pole type of recording or write head 30 that are shown in a section taken through a plane parallel with a data track on medium 10. The MR read head 80 includes the MR sensor 81 located between MR shields S1, S2.

PERPENDICULAR MAGNETIC RECORDING WRITE HEAD WITH COPLANAR MAIN POLE AND RETURN POLES AND MAGNETIC RECORDING SYSTEM

BACKGROUND OF THE INVENTION

1. Field of the Invention

This invention relates generally to perpendicular magnetic recording systems, and more particularly to perpendicular magnetic recording write heads for use in magnetic recording disk drives.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The recording or write head in perpendicular magnetic recording disk drives includes a main pole with a write pole tip for directing magnetic field to the recording layer, and one or more return poles for return of magnetic flux from the recording layer. The poles are typically formed in succession on a substrate, such as an end face of an air-bearing slider, using a series of deposition and patterning steps. Connecting studs are also required to be fabricated to make connection between the poles. The resulting head thus has the return poles spaced from the main pole in the along-the-track direction, which is also generally the direction of the flux return path.

What is needed is an improved perpendicular magnetic recording write head that is easier to fabricate.

SUMMARY OF THE INVENTION

The invention relates to a perpendicular magnetic recording write head with a main pole and return poles that are substantially coplanar. The write head includes a main pole, two return poles and a connecting stud that are all formed as a single layer in a single deposition and patterning step. The coplanar main and return poles lie in a plane parallel to the cross-track direction. The two return poles are thus spaced from the main pole in the cross-track direction. The main pole includes a write pole connected to it but lying in a plane spaced in the along-the-track direction from the plane of the main pole. The write head includes a helical coil wrapped around the main pole. The helical coil may also be wrapped around the return poles, with the winding direction in the return poles being opposite to the winding direction in the main pole. The write head may also include a trailing shield, which may be connected to the return poles or be "floating" (i.e., not connected to the return poles). The trailing shield may be part of a wraparound shield that includes side shields spaced on opposite sides of the write pole in the cross-track direction, with the wraparound shield being either connected to the return poles or floating.

The invention also relates to a perpendicular magnetic recording disk drive that includes the write head and a rotatable magnetic recording disk. The disk includes a substrate, a soft magnetic underlayer on the substrate as a magnetic flux return path, and a recording layer on the underlayer. When current is passed through the helical coil a magnetic field is induced in the main pole and directed perpendicularly to the recording layer in a data track aligned with the write pole, resulting in the magnetization of a region in the aligned data track. The path of the magnetic flux is then to the disk underlayer, through the underlayer to data tracks spaced cross-track from the data track aligned with the write pole, and back through the return poles.

For a fuller understanding of the nature and advantages of the present invention, reference should be made to the following detailed description taken together with the accompanying figures.

DETAILED DESCRIPTION OF THE INVENTION

Figure 1A:
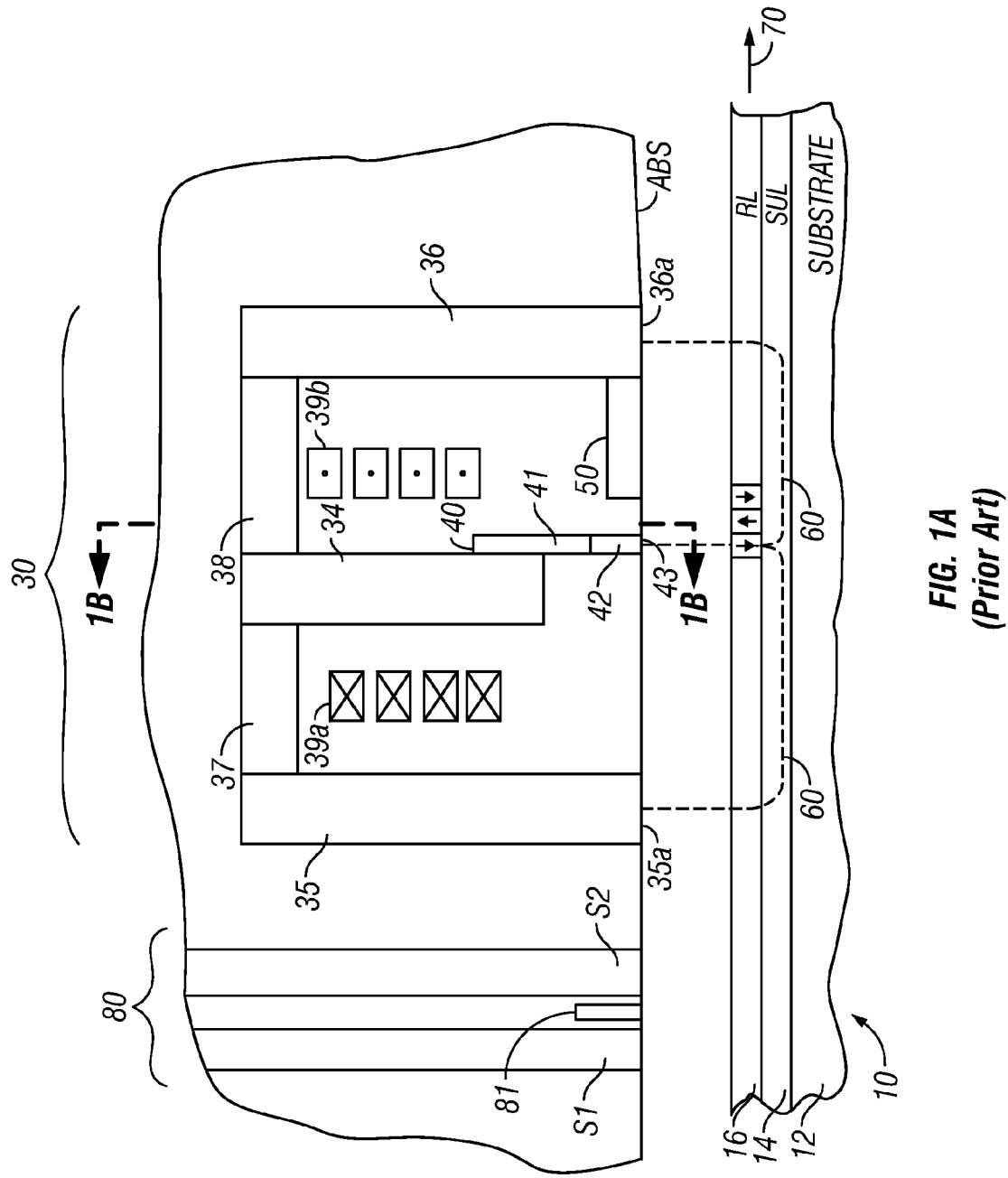
FIG. 1A is a side sectional view of a prior art perpendicular magnetic recording system showing a read head, a write head, and a recording medium.

As shown in FIG. 1A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a magnetoresistive (MR) read head 80 and a single write pole type of recording or write head 30 that are shown in a section taken through a plane parallel with a data track on medium 10. The MR read head 80 includes the MR sensor 81 located between MR shields S1, S2.

The write head 30 includes a yoke made up of the main pole 34, a first flux return pole 35, and yoke stud 37 connecting the main pole 34 and first return pole 35, a second flux return pole 36, and yoke stud 38 connecting the main pole 34 and second return pole 36; and a thin film helical coil 39a, 39b shown in section wrapped around main pole 34. A flared write pole (WP) 40 is part of the main pole 34 and has a flared portion 41 and a pole tip 42 with an end 43 that faces the outer surface of medium 10. Write current through coil 39a, 39b induces a magnetic field (shown by dashed line 60) from the WP 40 that passes through the RL 16 (to magnetize the region of the RL 16 beneath the WP 40), through the flux return path provided by the SUL 14, and back to the return poles 35, 36. In a magnetic recording disk drive implementation, the recording head is typically formed on an air-bearing slider that has its air-bearing surface (ABS) supported above the surface of medium 10, which is a rotatable magnetic recording disk with concentric circular data tracks. The pole tip end 43 is located substantially at the ABS, and the first and second return poles, 35, 36 have ends 35a, 36a, respectively, that are located substantially at the ABS and thus generally coplanar with pole tip end 43. In FIG. 1A, the medium 10 moves past the recording head in the direction indicated by arrow 70. The RL 16 is illustrated with perpendicularly recorded or magnetized regions, with adjacent regions having opposite magnetization directions, as represented by the arrows. The magnetic transitions between adjacent oppositely-directed magnetized regions are detectable by the read head (not shown) as the recorded bits. FIG. 1A also illustrates trailing shield (TS) 50 that forms part of a "wraparound" shield that is described in more detail in FIGS. 1B-1C.

Figure 1B:
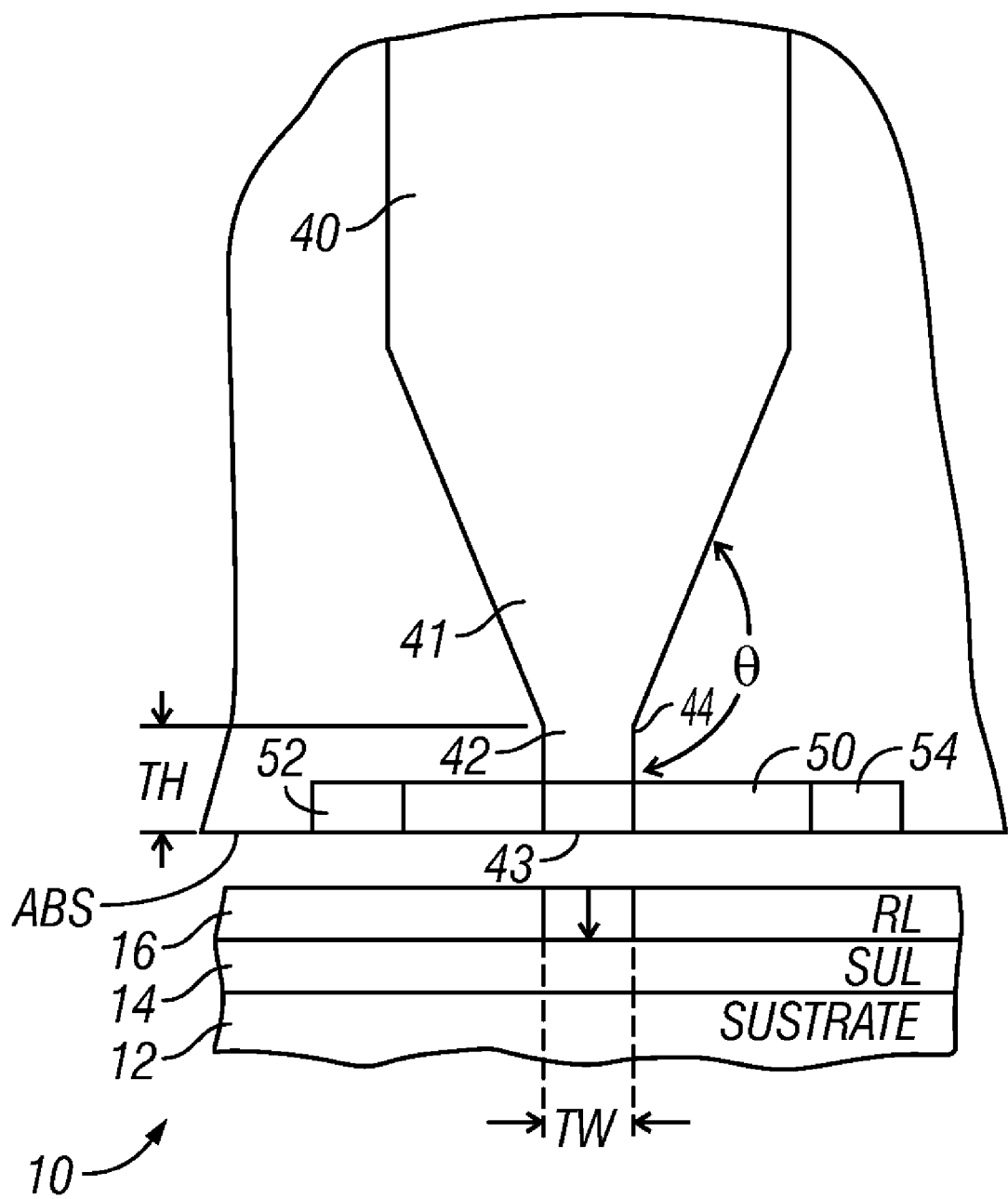
FIG. 1B is a view in the direction 1B-1B of FIG. 1A and illustrates the width of the write pole (WP) to substantially define the trackwidth (TW) of the data recorded in the recording layer (RL).

FIG. 1B is a view in the direction 1B-1B of FIG. 1A and better illustrates the flare region 41 of flared WP 40. The region between the WP tip 42 and the flare portion 41 is called the flare point 44. The flare point 44 of the WP 40 is sometimes referred to as the "choke" point because it is the point where the flux density is highest and where the WP 40 saturates. The WP tip 42 has a "height" from end 43 to flare point 44 called the throat height (TH). As shown in FIG. 1B, the two side walls of WP tip 42 define its width in the cross-track direction, which substantially defines the trackwidth (TW) of the data recorded in the RL 16. The region of the WP 40 above the flare region 41 is substantially wider than WP tip 42 below the flare region 41 and the flare point 44 is the transition point where the WP 40 begins to widen with distance from the ABS. The angle $\theta$ in FIG. 1B is called the flare angle and is between 90 and 180 degrees, typically between about 120 and 150 degrees. FIG. 1B also illustrates side shields 52, 54 that form part of the wraparound shield that generally surrounds the WP tip 42.

Figure 1C:
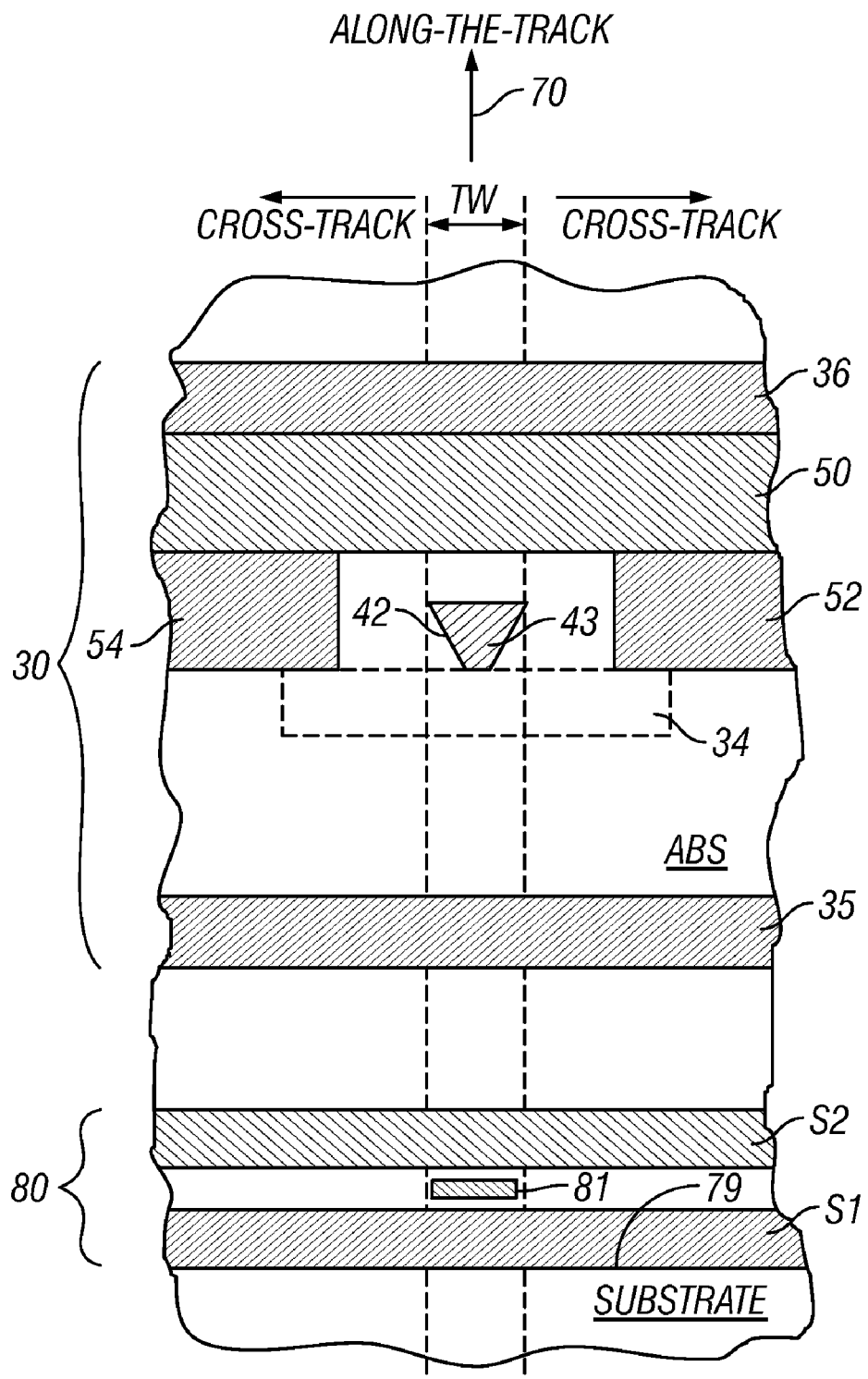
FIG. 1C is a view from the air-bearing surface (ABS) of the prior art write head in FIG. 1A and shows a wraparound shield substantially surrounding the write pole tip and connected to the return pole.

FIG. 1C illustrates the recording head 30 as seen from the recording medium 10. The ABS is the recording-layer-facing surface of the slider that faces the medium 10 and is shown in FIG. 1C without the thin protective overcoat typically present in an actual slider. The recording-layer-facing surface shall mean the surface of the slider or head carrier that is covered with a thin protective overcoat, the actual outer surface of the head carrier if there is no overcoat, or the outer surface of the overcoat. The phrase "substantially at the recording-layer-facing surface" shall mean actually at the surface or slightly recessed from the surface. The recording medium 10 moves relative to the head 30 in the direction 70, which is called the along-the-track direction. The dashed lines in FIG. 1C represent the sides of a data track. The width of the end 43 of write pole tip 42 substantially defines the track-width (TW) of the data tracks in the RL 16. The main pole 34 is shown with dashed lines because it is recessed from the ABS. The direction perpendicular to direction 70 and parallel to the plane of the ABS is called the cross-track direction.

The wraparound shield that includes side shields 52, 54 and TS 50 is described in detail as a shield for a conventional perpendicular recording head in U.S. Pat. No. 7,002,775 B2 assigned to the same assignee as this application. The shields 50, 52, 54 all have ends substantially at the recording-layer-facing surface. The shields 50, 52, 54 are typically connected to one another and substantially surround the WP pole tip 42 to from a "wraparound" shield. The TS 50 and side shields 52, 54 are separated from WP tip 42 by nonmagnetic gap material, typically alumina. The wraparound shield with shields 50, 52, 54 separated from the WP tip 42 by nonmagnetic gap material alters the angle of the write field and improves the write field gradient at the point of writing, and also shields the writing field at regions of the medium 10 away from the track being written. The wraparound shield is shown as being connected to the return pole 36 but it may also be a "floating" shield, meaning that it is not connected to either the return pole 36 or other portions of the yoke by flux-conducting material. In other variations of the write head 30, instead of a wraparound shield only a TS without side shields may be used. The TS may be either "floating" or connected to return pole 36.

The yoke and shields of head 30 are formed of soft ferromagnetic material, such as alloys of NiFe, CoFe and NiFeCo that are typically formed by electroplating. The WP 40 is formed of a high-moment material, such as a high-moment CoFe alloy, that is typically formed by sputter deposition, and may be a laminated structure.

FIG. 1C also illustrates the magnetoresistive (MR) read head 80 that includes the MR sensor 81 located between MR shields S1, S2. The films making up MR head 80 and write head 30 as shown in FIG. 1C are formed in succession on a substrate, which is an end surface 79 of an air-bearing slider, by a series of thin film deposition, etching and lithographic patterning processes. For example, each of the poles 35, 34, 36 and connecting studs 37, 38 (FIG. 1A) requires a separate deposition and patterning step, which increases the fabrication time and expense.

Figure 2A:
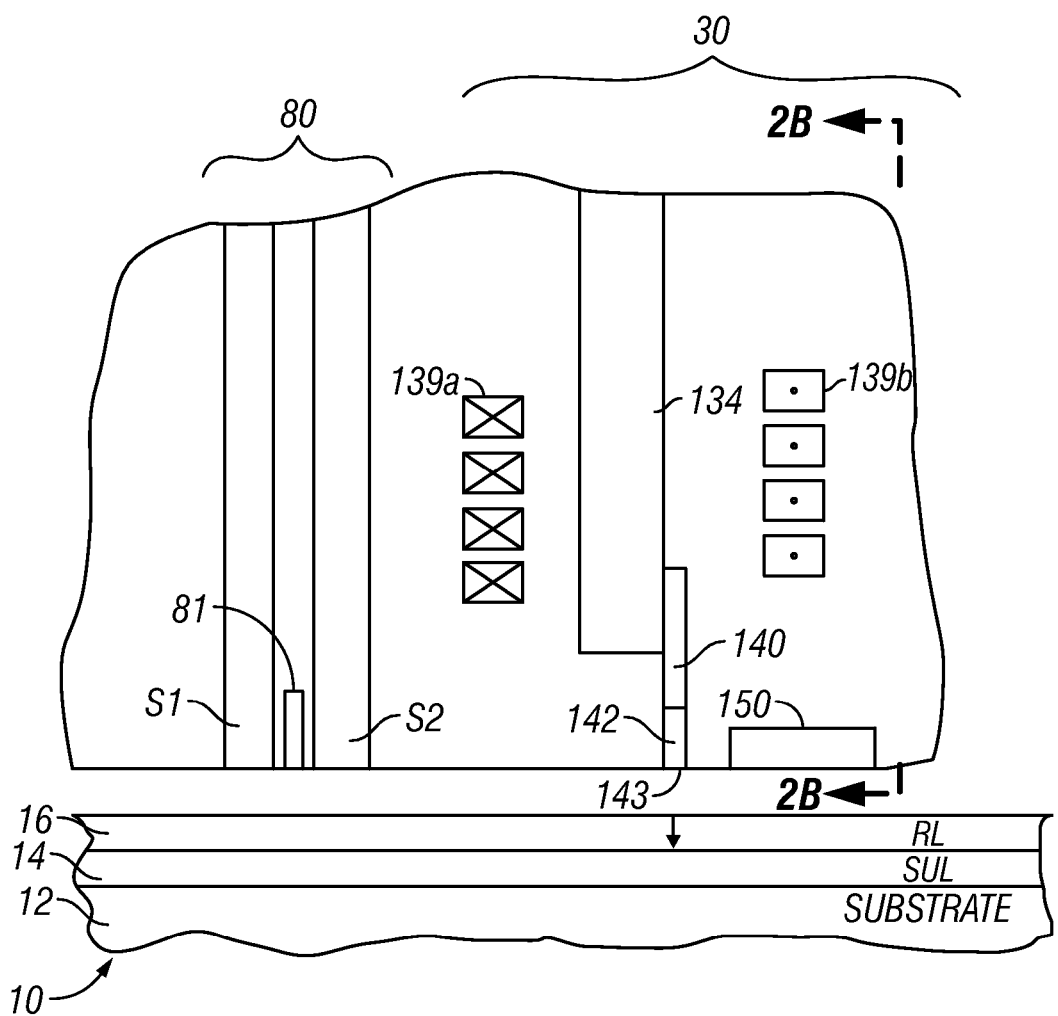
FIG. 2A is a side sectional view of the write head of this invention taken through a plane parallel to a data track

In this invention, the main pole, return poles and connecting studs are all coplanar and formed in the same deposition step. FIG. 2A is a side sectional view of the write head 130 of this invention taken through a plane parallel to a data track, like the view of the prior art write head 30 in FIG. 1A. FIG. 2A shows a first set of coil segments 139a, the main pole 134 and connected write pole (WP) 140, a second set of coil segments 139b, and trailing shield (TS) 150. In FIG. 2A the flux return path is not visible, unlike item 60 in FIG. 1A, because the return poles are substantially coplanar with main pole 134. Also shown in FIG. 2A is the MR head 80 with MR sensor 81 and MR shields S1, S2.

Figure 2B:
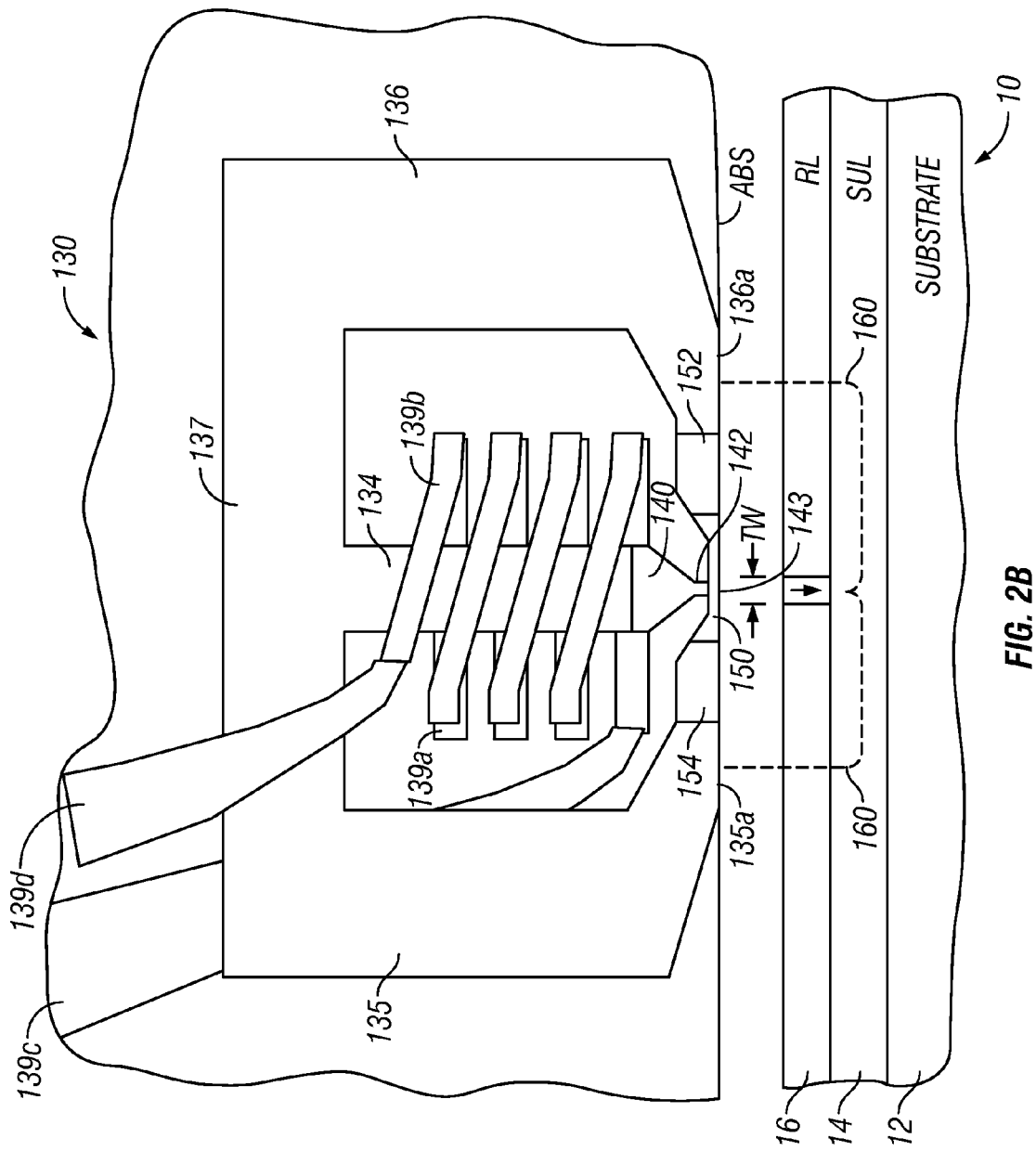
FIG. 2B is a view in the direction 2B-2B of FIG. 2A and illustrates the coplanar main pole and return poles.

FIG. 2B is a view in the direction 2B-2B of FIG. 2A. The main pole 134, first return pole 135, second return pole 136 and connecting stud 137 are all formed as a single continuous layer. The return poles 135, 136 are spaced on opposite sides of main pole 134 in the cross-track direction. FIG. 2A also illustrates the TS 150 formed as part of a wraparound shield that includes side shields 152, 154. FIG. 2A also illustrates the two sets of coil segments 139a, 139b. The first coil segments 139a are formed before the main pole and return poles and the second coil segments 139b are formed after the main pole and return poles. The two sets of coil segments 139a, 139b are then connected at their ends to form the helical coil that is wrapped around the main pole 134. Write current to and from leads 139c, 139d travels in a helical path around the main pole 134. Depending on the direction of current, a magnetic field is induced in one of two directions from WP 140 generally perpendicular to the RL. For example, in FIG. 2A the coil is wrapped in a direction such that write current in from lead 139c and out through lead 139d would induce a magnetic field perpendicularly toward the RL, as shown by the direction of the arrow in RL just beneath the end 143 of WP 140. The return poles 135, 136 may optionally have ends 135a, 136a, respectively, that are tapered toward the end 143 of WP 140. This results in the return pole end faces 135a, 136a being located closer to the main pole 134 than the return pole regions recessed from the ABS and facilitates the flux return path 160 while still providing space for formation of the coil segments 139a, 139b.

Figure 2C:
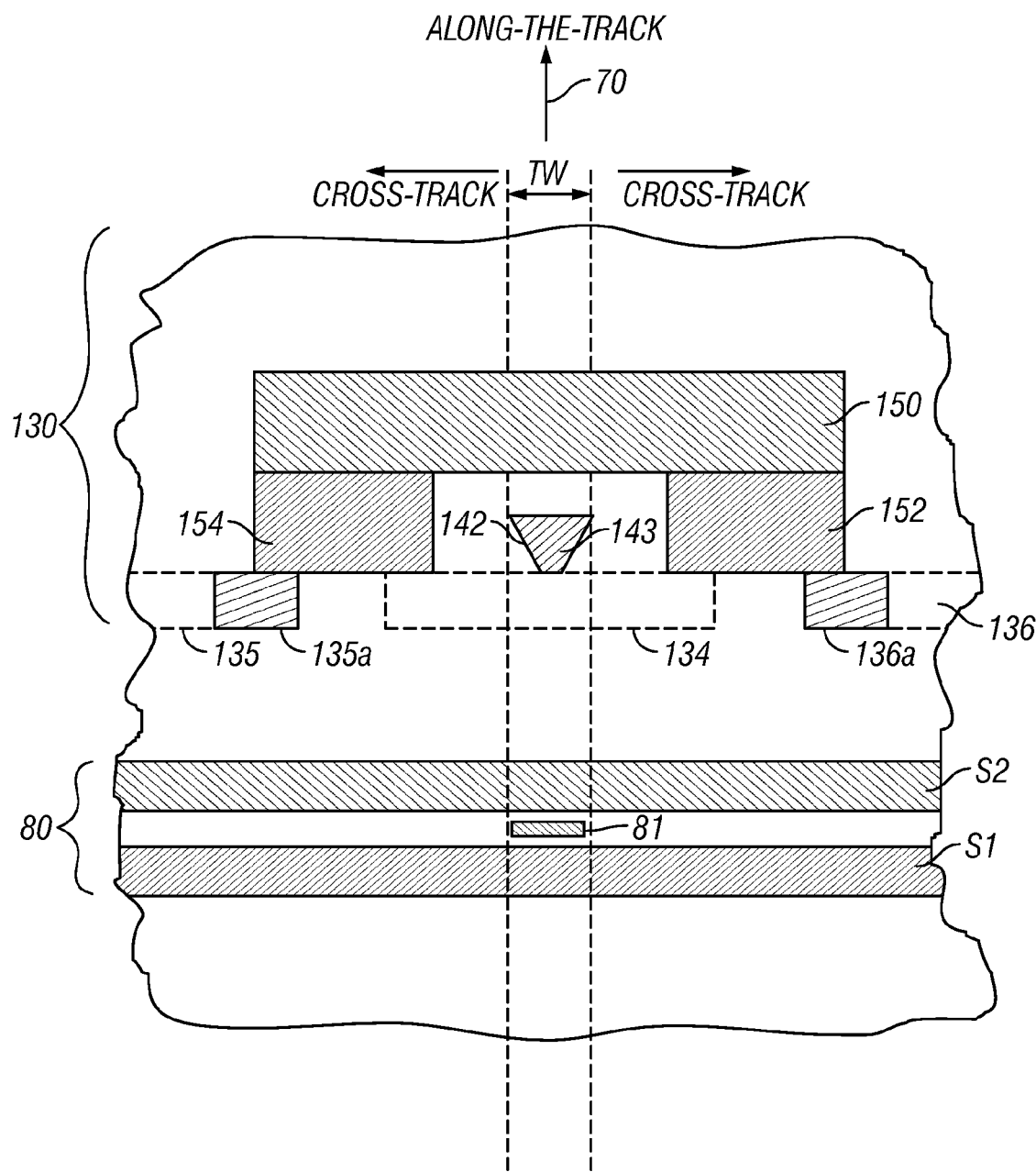
FIG. 2C is a view from the air-bearing surface (ABS) of the write head in FIG. 2A and shows the coplanar main pole and return poles and a wraparound shield substantially surrounding the write pole tip and connected to the return poles.

FIG. 2C illustrates the write head 130 as seen from the recording medium 10. The main pole 134 is shown in dashed lines because it is recessed from the ABS. The return pole end faces 135a, 136a are substantially at the ABS, with the portions of return poles 135, 136 recessed from the ABS being shown in dashed line. Thus the cross-track spacing between the ends 135a, 136a is less than the cross-track spacing between the return poles 135, 136 at regions recessed from the ABS. The main pole 134 and return poles 135, 136 are all formed in the same deposition step and thus lie in substantially the same plane. The WP 140 (FIG. 2A) with pole tip 142 and end 143 is formed on top of main pole 134 in a separate deposition step, typically by sputter deposition, which results in the WP 140 being located in a different plane in the along-the-track direction than main pole 134 and return poles 135, 136.

The wraparound shield that includes side shields 152, 154 and TS 150 all have ends substantially at the ABS. The shields 150, 152, 154 are typically connected to one another and substantially surround the WP pole tip 142 to from a "wraparound" shield. The TS 150 and side shields 152, 154 are separated from WP tip 142 by nonmagnetic gap material, typically alumina. The wraparound shield with shields 150, 152, 154 separated from the WP tip 142 by nonmagnetic gap material alters the angle of the write field and improves the write field gradient at the point of writing, and also shields the writing field at regions of the medium 10 away from the track being written. The wraparound shield is shown as being connected to the return poles 135, 136 but it may also be a "floating" shield, meaning that it is not connected to either of the return poles or other portions of the yoke by flux-conducting material. In other variations of the write head 130, instead of a wraparound shield only a TS without side shields may be used. The TS may be either "floating" or connected to one or both of the return poles 135, 136.

Figure 3:
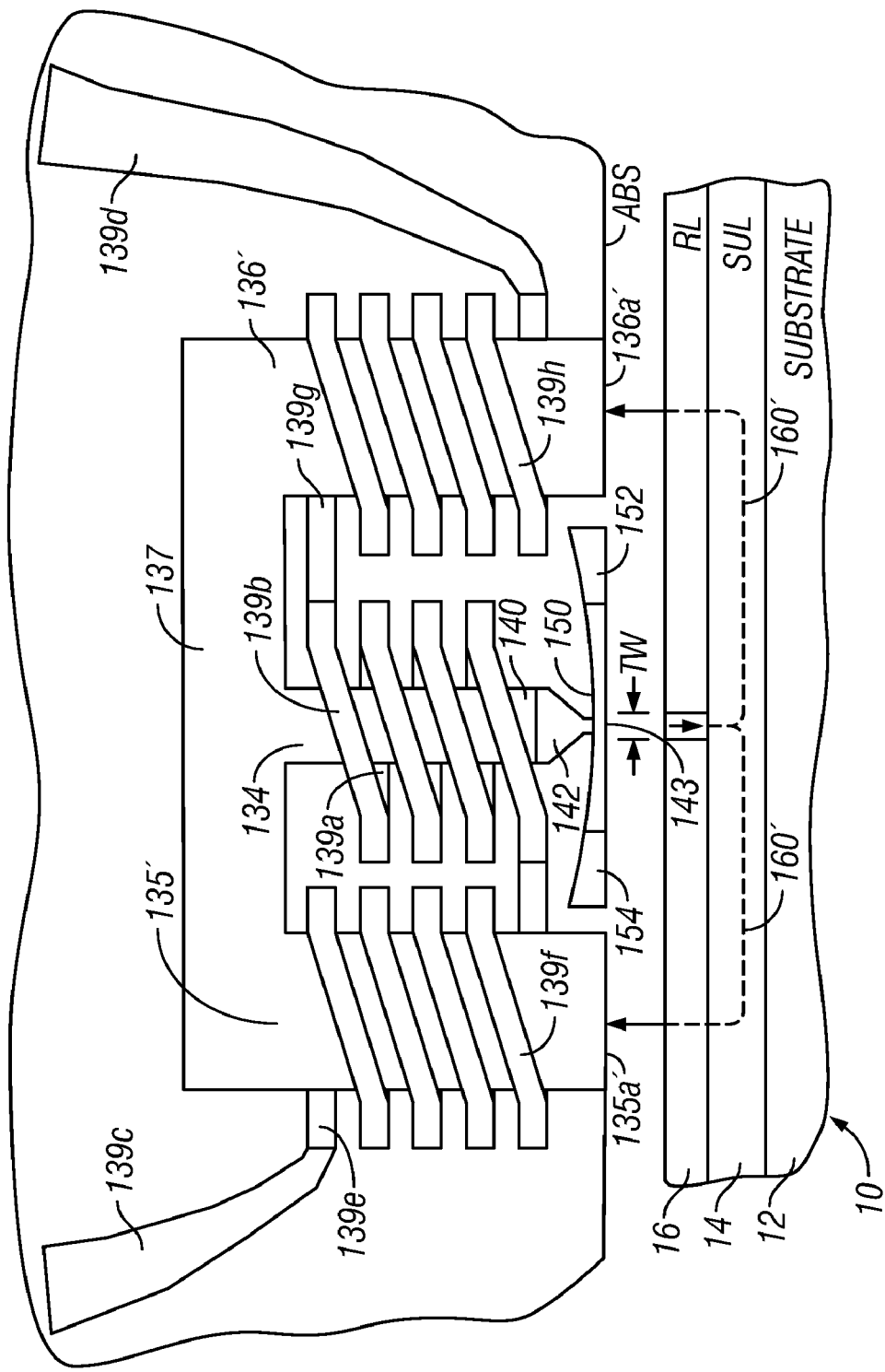
FIG. 3 is a side sectional view of an implementation of the write head of this invention taken through a plane parallel to a data track and illustrates several optional features.

FIG. 3 is a side sectional view of an implementation of the write head of this invention taken through a plane parallel to a data track and illustrates several optional features. One optional feature is that the return poles 135', 136' may be conventional, generally perpendicularly directed poles with ends 135a', 136a', respectively, that are not tapered to be located closer to the end 143 of WP 140. Another optional feature is that the helical coil may also wrapped be around each of the return poles 135', 136'. This type of helical coil includes coil segments 139e, 139f wrapped around return pole 135' and coil segments 139g, 139h wrapped around return pole 136'. The coil windings around return poles 135', 136' are in the opposite direction of the winding around main pole 134. Thus write current in from lead 139c and out through lead 139d would induce a magnetic field perpendicularly into the RL, as shown by the direction of the arrow in RL just beneath the end 143 of WP 140, as well as perpendicularly out of the RL as shown by the arrows near the return pole ends 135a', 136a'. This is illustrated by flux return path 160'. FIG. 3 also illustrates the previously mentioned feature that the wraparound pole may be floating, as shown by the absence of connection between side shields 154, 152 and return poles 135a', 136a', respectively.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions in data tracks of a magnetic recording layer comprising:
   a main pole;
   first and second return poles spaced on opposite sides of the main pole in the cross-track direction, the main pole and return poles lying in the same plane;
   a write pole connected to the main pole and having an end facing the recording layer;
   an electrically conductive helical coil for generating magnetic flux in the main pole and its connected write pole, the helical coil comprising a main pole portion wrapped around the main pole in a first direction, a first return pole portion wrapped around the first return pole in a direction opposite said first direction, and a second return pole portion wrapped around the second return pole in a direction opposite said first direction; and
   a trailing shield having an end generally coplanar with the write pole end and spaced from the write pole end in the along-the-track direction.

2. The write head of claim 1 wherein the return poles are connected to the main pole by a yoke and wherein the trailing shield is a floating shield not connected to the return poles or the yoke.

3. The write head of claim 1 wherein the return poles are connected to the main pole by a yoke and wherein the trailing shield is connected to at least one of said first return pole, said second return pole and said yoke.

4. The write head of claim 1 further comprising a pair of side shields having ends generally coplanar with the write pole end and spaced on opposite sides from the write pole end in the cross-track direction.

5. The write head of claim 4 wherein the side shields and trailing shield are contiguous, thereby forming a wraparound shield.

6. The write head of claim 5 wherein the return poles are connected to the main pole by a yoke and wherein the wraparound shield is a floating shield not connected to the return poles or the yoke.

7. The write head of claim 5 wherein the return poles are connected to the main pole by a yoke and wherein the wraparound shield is connected to at least one of said first return pole, said second return pole and said yoke.

8. The write head of claim 1 wherein each of the return poles has an end facing the recording layer, the cross-track spacing between said ends being less than the cross-track spacing between the return poles at regions recessed from said ends.

9. The write head of claim 1 wherein the write head is formed on a generally planar substrate, wherein the helical coil further comprises a first set of electrically conductive generally coplanar coil segments on the substrate and a second set of electrically conductive generally coplanar coil segments spaced from the first set of coil segments in the along-the-track direction, and wherein the main pole is located between the planes of said first and second sets of coil segments.

10. A magnetic recording write head for use in a magnetic recording disk drive having a disk with data tracks, the head being formed on a slider having an air-bearing surface (ABS) facing the disk and comprising:
    a planar substrate orthogonal to the ABS;
    a single layer of ferromagnetic material on the substrate and patterned into a main pole, first and second return poles spaced on opposite sides of the main pole in the cross-track direction and having ends substantially at the ABS, and a connecting stud interconnecting the first and second return poles and the main pole at a region recessed from the ABS, wherein the main pole, the first and second return poles and the connecting stud are formed of the same material and have the same thickness on the substrate;
    a write pole on and non-coplanar with the main pole and having an end substantially at the ABS;
    an electrically conductive helical coil wrapped around the main pole for generating magnetic flux in the main pole and its connected write pole, the helical coil comprising a first set of electrically conductive coplanar coil segments on the substrate between the substrate and said single layer of ferromagnetic material and a second set of electrically conductive coplanar coil segments spaced from the first set of coil segments in the along-the-track direction, wherein said single layer of ferromagnetic material is located between the planes of said first and second sets of coplanar coil segments; and a trailing shield having an end substantially at the ABS and spaced from the write pole end in the along-the-track direction.

11. The write head of claim 10 wherein the trailing shield is a floating shield not connected to the return poles.

12. The write head of claim 10 wherein the trailing shield is connected to at least one of said return poles.

13. The write head of claim 10 further comprising a pair of side shields having ends substantially at the ABS and spaced on opposite sides from the write pole end in the cross-track direction.

14. The write head of claim 13 wherein the side shields and trailing shield are contiguous.

15. The write head of claim 14 wherein the contiguous side shields and trailing shield are a floating shield not connected to the return poles.

16. The write head of claim 14 wherein the contiguous side shields and trailing shield are connected to both of said return poles.

17. The write head of claim 10 wherein the cross-track spacing between the ends of the return poles is less than the cross-track spacing between the return poles at regions recessed from the ABS.

18. The write head of claim 10 wherein the helical coil further comprises a main pole portion wrapped around the main pole in a first direction, a first return pole portion wrapped around the first return pole in a direction opposite said first direction, and a second return pole portion wrapped around the second return pole in a direction opposite said first direction.

19. A magnetic recording disk drive comprising:
   a rotatable magnetic recording disk comprising a substrate, an underlayer on the substrate, and a recording layer on the underlayer, the recording layer having a plurality of circular concentric data tracks; and
   the write head of claim 10;
   wherein the path of generated magnetic flux is from the write pole through a data track aligned with the write pole, through the disk underlayer to data tracks spaced cross-track from the data track aligned with the write pole, and back through the first and second return poles.

* * * * *